US012608341B2

(12) United States Patent      (10) Patent No.:   US 12,608,341 B2
Stone et al.            (45) Date of Patent:      Apr. 21, 2026

(54) DOMAIN-FOCUSED NATURAL LANGUAGE QUESTION AND ANSWER

(71) Applicant: Lockheed Martin Corporation, Bethesda, MD (US)

(72) Inventors: Spenser Warren Stone, Dallas, TX (US); Corey Benjamin Mutnik, Plantation, FL (US); Matthew Joseph Studer, Brooklyn, NY (US); Nathan Richards Fields, Rockville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 18/809,141

(22) Filed: Aug. 19, 2024

(65) Prior Publication Data

US 2026/0050575 A1     Feb. 19, 2026

(51) Int. Cl.
   *G06F 16/14*       (2019.01)
   *G06F 40/40*       (2020.01)
   *G06N 20/00*       (2019.01)

(52) U.S. Cl.
   CPC ............ *G06F 16/156* (2019.01); *G06F 40/40* (2020.01); *G06N 20/00* (2019.01)

(58) Field of Classification Search
   CPC ........ G06F 16/156; G06F 40/40; G06N 20/00
   See application file for complete search history.

(56) References Cited

U.S. PATENT DOCUMENTS 11,288,566 B2    3/2022   Liu et al.
11,397,762 B2    7/2022   Raval Contractor et al.
11,449,556 B2    9/2022   Jawagal et al.
(Continued)

FOREIGN PATENT DOCUMENTS

CN      116932708 A    10/2023
KR      102146031 B1    8/2020
WO     2023132834 A1    7/2023

OTHER PUBLICATIONS

Lewis et al., Facebook AI Research, "Retrieval-Augmented Generation for Knowledge-Intensive NLP Tasks", Publicly available as early as Apr. 12, 2021 (19 pages).

(Continued)

*Primary Examiner* — William Spieler

(74) *Attorney, Agent, or Firm* — Michael Best & Friedrich LLP

(57)           ABSTRACT

A domain-focused natural language question and answer system. The system includes one or more electronic processors. The one or more electronic processors are configured to create, from a plurality of files, a plurality of fine-tuning data examples, each respective fine-tuning data example of the plurality of fine-tuning data examples including a question, an answer, and a supporting citation. The one or more electronic processors are further configured to fine-tune a pre-trained foundational machine learning model using the plurality of fine-tuning data examples to generate a fine-tuned machine learning model, input a natural language question to the fine-tuned machine learning model, and retrieve, from the fine-tuned machine learning model, a natural language answer to the natural language question and an indication of one or more files, one or more relevant sections, or both that the natural language answer is based on.

18 Claims, 9 Drawing Sheets

(56)　　　　　References Cited

U.S. PATENT DOCUMENTS

| | | | |
|---|---|---|---|
| 11,699,432 | B2 | 7/2023 | Bender et al. |
| 11,790,889 | B2 | 10/2023 | Fernández Musoles et al. |
| 2016/0180242 | A1* | 6/2016 | Byron ................... G06N 5/041 |
| | | | 706/11 |
| 2019/0340172 | A1* | 11/2019 | McElvain ............. G06F 16/248 |
| 2020/0387675 | A1* | 12/2020 | Nugent ................. G06N 3/045 |
| 2021/0150147 | A1 | 5/2021 | Yu et al. |
| 2022/0237422 | A1* | 7/2022 | Abraham ............. G06F 40/279 |
| 2022/0292262 | A1 | 9/2022 | Japa et al. |
| 2022/0300712 | A1 | 9/2022 | Bhattacharya et al. |
| 2022/0318230 | A1 | 10/2022 | Sikka et al. |
| 2023/0061906 | A1 | 3/2023 | Gaur et al. |
| 2023/0223016 | A1* | 7/2023 | Konam ................. G06F 40/284 |
| | | | 704/231 |
| 2023/0259705 | A1* | 8/2023 | Tunstall-Pedoe .... G06N 3/0499 |
| | | | 704/9 |
| 2024/0289863 | A1* | 8/2024 | Smith Lewis ......... G06N 3/008 |
| 2025/0103826 | A1* | 3/2025 | Dicklin ............... G06F 16/9032 |

OTHER PUBLICATIONS

Transformers Domain Adaptation, Github, <https://github.com/georgian-io/Transformers-Domain-Adaptation?tab=readme-ov-file>, Accessed on Jun. 13, 2024 (4 pages).

* cited by examiner

*FIG. 2*

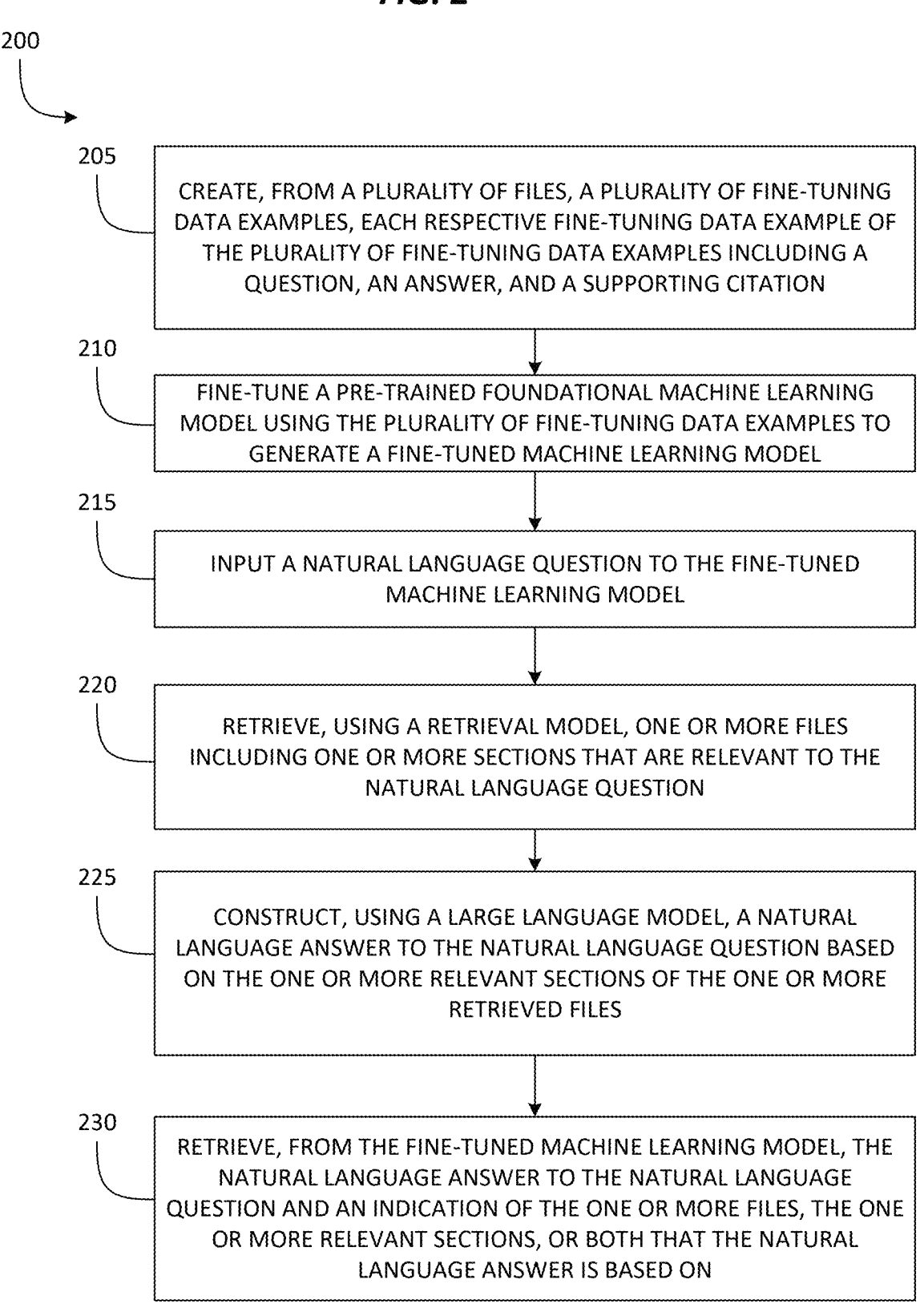

200

205

CREATE, FROM A PLURALITY OF FILES, A PLURALITY OF FINE-TUNING DATA EXAMPLES, EACH RESPECTIVE FINE-TUNING DATA EXAMPLE OF THE PLURALITY OF FINE-TUNING DATA EXAMPLES INCLUDING A QUESTION, AN ANSWER, AND A SUPPORTING CITATION

210

FINE-TUNE A PRE-TRAINED FOUNDATIONAL MACHINE LEARNING MODEL USING THE PLURALITY OF FINE-TUNING DATA EXAMPLES TO GENERATE A FINE-TUNED MACHINE LEARNING MODEL

215

INPUT A NATURAL LANGUAGE QUESTION TO THE FINE-TUNED MACHINE LEARNING MODEL

220

RETRIEVE, USING A RETRIEVAL MODEL, ONE OR MORE FILES INCLUDING ONE OR MORE SECTIONS THAT ARE RELEVANT TO THE NATURAL LANGUAGE QUESTION

225

CONSTRUCT, USING A LARGE LANGUAGE MODEL, A NATURAL LANGUAGE ANSWER TO THE NATURAL LANGUAGE QUESTION BASED ON THE ONE OR MORE RELEVANT SECTIONS OF THE ONE OR MORE RETRIEVED FILES

230

RETRIEVE, FROM THE FINE-TUNED MACHINE LEARNING MODEL, THE NATURAL LANGUAGE ANSWER TO THE NATURAL LANGUAGE QUESTION AND AN INDICATION OF THE ONE OR MORE FILES, THE ONE OR MORE RELEVANT SECTIONS, OR BOTH THAT THE NATURAL LANGUAGE ANSWER IS BASED ON

| source_file | section_text | subsection_text | sentence | answer | question | Additional vocab (example only) |
|---|---|---|---|---|---|---|
| 405 | 410 | 415 | 420 | 425 | 430 | 435 |
| file123 | Company X is the best place to work for many reasons according to employees. Company X employees consistently rank the company as one of the best places to work. Company X is a manufacturer of the Widget Y, the only 5th gen widget in production. | Company X is the best place to work for many reasons according to employees. Company X employees consistently rank the company as one of the best places to work. | Company X is the best place to work for many reasons according to employees. | Company X | What company is the best place to work according to employees? | Company X, Widget Y |
| file123 | Company X is the best place to work for many reasons according to employees. Company X employees consistently rank the company as one of the best places to work. Company X is a manufacturer of the Widget Y, the only 5th gen widget in production. | Company X is the best place to work for many reasons according to employees. Company X employees consistently rank the company as one of the best places to work. | Company X employees consistently rank the company as one of the best places to work. | Company X | What company does Company X employees consistently rank as one of the best places to work? | Company X, Widget Y |
| file123 | Company X is the best place to work for many reasons according to employees. Company X employees consistently rank the company as one of the best places to work. Company X is a manufacturer of the Widget Y, the only 5th gen widget in production. | Company X is a manufacturer of the Widget Y, the only 5th gen widget in production. | Company X is a manufacturer of the Widget Y, the only 5th gen widget in production. | Widget Y | What is the only 5th gen widget in production? | 5th gen |

Model With Augmented Vocabulary

DOMAIN-FOCUSED NATURAL LANGUAGE QUESTION AND ANSWER

FIELD

Examples described herein generally relate to question and answering systems and methods, and, in particular, natural language question and answering systems (e.g., "chat bots" or "bots") configured to provide answers to domain focused questions with supporting citations.

SUMMARY

Systems that provide natural language answers to natural language questions have become increasingly popular. However, there exists a need for a system that generates a natural language answer based on domain specific files and provides supporting citations to the domain specific files used to generate the answer. For example, information may be spread across multiple formats (e.g., video, web pages, documents, emails, etc.) and existing search systems may not adequately search across all such formats nor provide relevant context and source documents from such multi-domain datasets through a natural language user interface. In particular, existing search solutions do not adapt language models or search models to the data nor do such solutions allow users to query in a natural question format. Existing search solutions may also have a high degree of keyword sensitivity.

Therefore, the implementations described herein provide systems and methods for providing a natural language answer to a natural language question based on domain specific files and providing supporting citations to the domain specific files used to generate the answer. The systems and methods described herein may be fine-tuned on content-specific texts, which configures the systems and methods to retrieve answers to open-ended questions related to a specific domain. Furthermore, the systems and methods described herein may, in addition to answering a question, include references (e.g., links) to and relevant excerpts from source material associated with a provided answer, such as, for example, paper links or confluence references. Some implementations use automatically generated data (e.g., generated without human interaction) to create question-answer datasets without input from subject matter experts. The automatic generation of datasets allows vocabulary expansion to be performed. Some implementations, also perform fine-tuning on a retrieval augmented generation model to provide domain-specific responses that can process domain specific vocabulary correctly. For example, as an extension of fine-tuning, examples described herein perform vocabulary expansion to allow the model (e.g., a large language model) to learn both the new domain and the corresponding vocabulary (creating a domain-adapted transformer), which allows for improved measure of document response during the retrieval process.

One example implementation provides a domain-focused natural language question and answer system. The system includes one or more electronic processors. The one or more electronic processors are configured to create, from a plurality of files, a plurality of fine-tuning data examples, each respective fine-tuning data example of the plurality of fine-tuning data examples including a question, an answer, and a supporting citation. The one or more electronic processors are further configured to fine-tune a pre-trained foundational machine learning model using the plurality of fine-tuning data examples to generate a fine-tuned machine learning model, input a natural language question to the fine-tuned machine learning model, and retrieve, from the fine-tuned machine learning model, a natural language answer to the natural language question and an indication of one or more files, one or more relevant sections, or both that the natural language answer is based on. The fine-tuned machine learning model is configured to generate the natural language answer and the indication of the one or more files, the one or more relevant sections, or both that the answer is based on by retrieving, using a retrieval model, the one or more files including the one or more sections relevant to the natural language question and constructing, using a large language model, the natural language answer to the natural language question based on the one or more relevant sections of the one or more retrieved files.

Another example implementation provides a method for generating a fine-tuned machine learning model to provide a domain-focused natural language answer to a natural language question. The method includes creating, from a plurality of files, a plurality of fine-tuning data examples, each respective fine-tuning data example of the plurality of fine-tuning data examples including a question, an answer, and a supporting citation. The method further includes fine-tuning a pre-trained foundational machine learning model using the plurality of fine-tuning data examples to generate a fine-tuned machine learning model, inputting a natural language question to the fine-tuned machine learning model, and retrieving, from the fine-tuned machine learning model, a natural language answer to the natural language question and an indication of one or more files, one or more relevant sections, or both that the natural language answer is based on. The fine-tuned machine learning model is configured to generate the natural language answer and the indication of the one or more files, the one or more relevant sections, or both that the answer is based on by retrieving, using a retrieval model, the one or more files including the one or more sections relevant to the natural language question and constructing, using a large language model, the natural language answer to the natural language question based on the one or more relevant sections of the one or more retrieved files.

Yet another example implementation provides a domain-focused natural language question and answer system. The system includes one or more electronic processors. The one or more electronic processors are configured to create, from a plurality of files, a plurality of fine-tuning data examples, each respective fine-tuning data example of the plurality of fine-tuning data examples including a question, an answer, and a supporting citation. The one or more electronic processors are further configured to fine-tune a pre-trained foundational machine learning model using the plurality of fine-tuning data examples to generate a fine-tuned machine learning model, input a natural language question to the fine-tuned machine learning model, and retrieve, from the fine-tuned machine learning model, an indication of one or more files, one or more sections, or both that are relevant to the natural language question. The fine-tuned machine learning model is configured to generate the indication of the one or more files, the one or more sections, or both that are relevant to the natural language question by retrieving, using a retrieval model, the one or more files including the one or more sections relevant to the natural language question.

BRIEF DESCRIPTION OF THE DRAWINGS

FIG. 2 is a flowchart illustrating a method for generating a fine-tuned machine learning model to provide a domain-focused natural language answer to a natural language question implemented by the system of FIG. 1 according to some implementations.

FIG. 4 is table of fine-tuning data examples according to some implementations.

DETAILED DESCRIPTION

Before any implementations are explained in detail, it is to be understood that the implementations described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Figure 1:
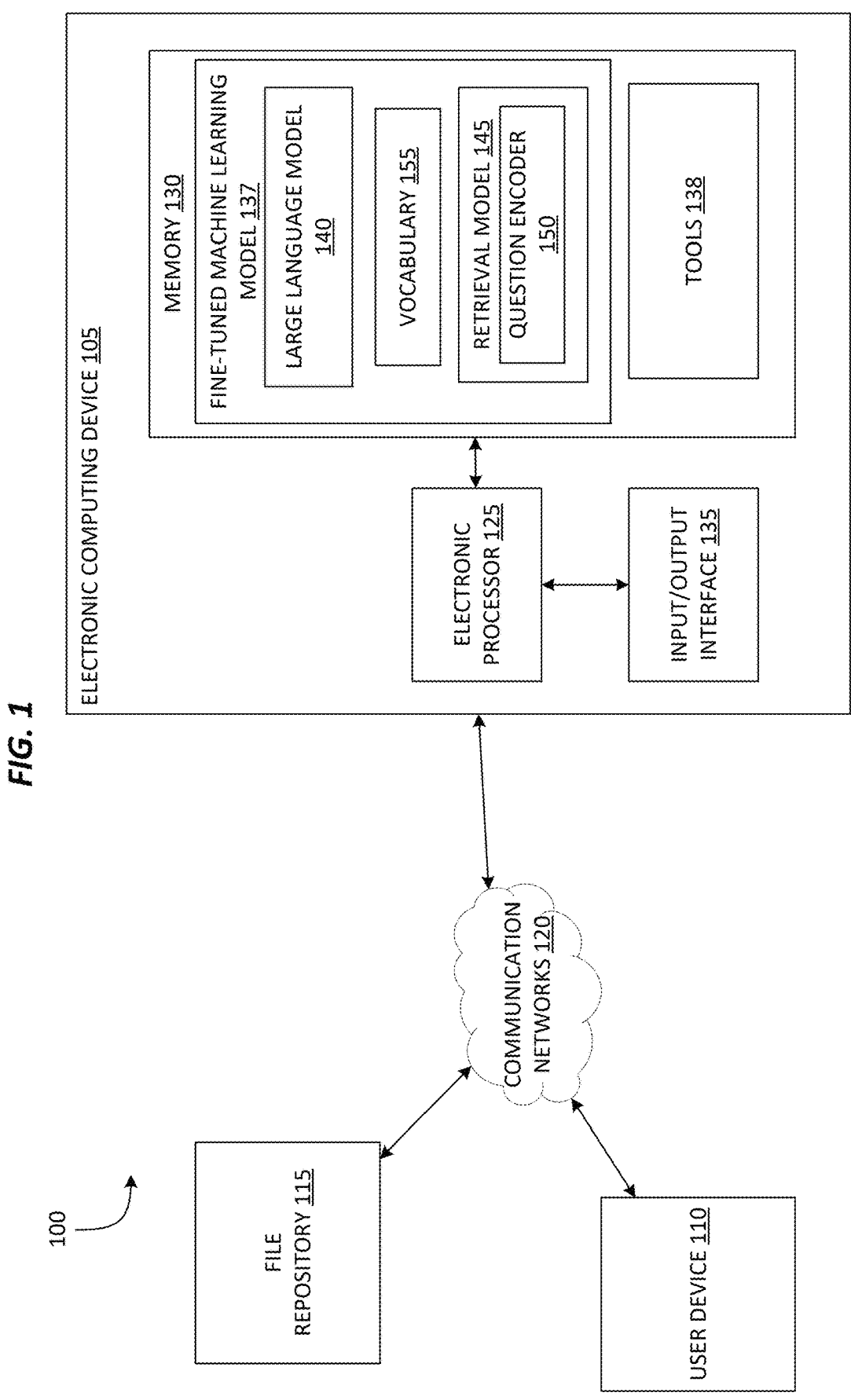
FIG. 1 is a block diagram of a domain-specific natural language question and answer system according to some implementations.

FIG. 1 schematically illustrates an example domain-specific natural language question and answer system 100. In some implementations, the system 100 includes an electronic computing device 105, a user device 110, and a file repository 115.

It should be understood that the system 100 is provided as an example and, in some implementations, the system 100 may include additional components. For example, the system 100 may include one or more electronic computing devices 105, one or more user devices 110, one or more file repositories 115, or combinations thereof in various configurations.

As illustrated, the components of the system 100, such as the electronic computing device 105, the user device 110, and the file repository 115, are communicatively coupled over one or more wireless or wired communication networks 120. The communication networks 120 of the system 100 may be wired or implemented wirelessly using any suitable protocol. For example, the communication networks 120 may be implemented using one or more of a wide area network, such as the Internet, a Long Term Evolution (LTE) network, a Global System for Mobile Communications (or Groupe Spécial Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, a local area network, for example a Wi-Fi network, a personal area network, for example a Bluetooth™ network, and combinations or derivatives thereof. For example, the electronic computing device 105, the user device 110, and the file repository 115 may be configured to communication via one or more of the Internet (including public and private Internet Protocol (IP) networks), a Bluetooth network, a Wi-Fi network, for example operating in accordance with an Institute of Electrical and Electronics Engineers (IEEE) 802.11 standard (e.g., 802.11a, 802.11b, 802.11g, 802.11ax), a 3G standard network (including Global System for Mobiles (GSM) and Code Division Multiple Access (CDMA) standards), an LTE (Long-Term Evolution) network or other types of GSM networks, a 5G (including a network architecture compliant with, for example, the Third Generation Partnership Project (3GPP) Technical Specification (TS) 23 specification series and a new radio (NR) air interface compliant with the 3GPP TS 38 specification series) standard network, a Citizens Broadband Radio Service (CBRS), Worldwide Interoperability for Microwave Access (WiMAX) network, for example operating in accordance with an IEEE 802.16 standard, a Low Earth Orbit (LEO) network (e.g., for satellite phones or Internet connection), a Geosynchronous Orbit (GEO) network (e.g., for satellite phones), an Evolution-Data Optimized (EV-DO) network, an Enhanced Data Rates for Global Evolution (EDGE) network, or another similar type of wireless network.

The electronic computing device 105 includes an electronic processor 125 (for example, a microprocessor, application-specific integrated circuit (ASIC), or another suitable electronic device), a memory 130 (for example, a non-transitory, computer-readable storage medium), and an input/output interface 135. The electronic computing device 105 includes, as part of the input/output interface 135, a transceiver for communicating with one or more components of the system 100 via the communication networks 120. The electronic computing device 105 also includes electrical and electronic components (not shown) that provide power, operation control, and protection to the components and modules within the electronic computing device 105. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. FIG. 1 illustrates only one example implementation of the electronic computing device 105. The electronic computing device 105 may include fewer or additional components (for example, the electronic computing device 105 may include multiple electronic processors) and may perform functions other than those explicitly described herein. It should be understood that the functionality described herein as being performed by the electronic processor 125 may be performed by multiple electronic processors that may be located in multiple electronic computing devices. Additionally, some of the functionality described herein as being performed by the electronic processor 125 may be performed by an electronic processor included in the file repository 115 or an electronic processor included in the user device 110.

The memory 130 may include a program storage area and a data storage area. The electronic processor 125 is connected to the memory 130 and executes computer readable code ("software") stored in a random access memory (RAM) of the memory (for example, during execution), a read only memory (ROM) of the memory (for example, on a generally permanent basis), or another non-transitory computer readable medium. The software may include firmware, one or more applications, program data, filters, rules, one or more program modules, and/or other executable instructions. The electronic processor 125 is configured to retrieve from the memory 130 and execute, among other things, instructions related to the processes and methods described herein (for example, the method 200 of FIG. 2 described below). In the example illustrated in FIG. 1, the memory 130 includes a fine-tuned machine learning model 137 (for example, a retrieval-augmented generation (RAG) model) (also referred to herein as a question-and-answer model) and one or more tools 138 (for example, one or more machine learning models) used to create fine-tuning data examples for the fine-tuned machine learning model 137. In some example implementations, the tools 138 are included in a memory other than the memory 130 including the fine-tuned machine learning model 137. For example, in some implementations, the tools 138 are included in a memory of a computing device (for example, a host computer) different from the computing device 105 and the electronic processor 125 may access the tools 138 by calling the host computer or requesting the tools from the host computer. As one non-limiting example, one or more of the tools 138 may be accessed by the electronic processor 125 via an application programming interface (API).

In some implementations, the fine-tuned machine learning model 137 includes a set of machine learning models, such as, for example, a large language model 140 and a retrieval model 145 (for example, a deep passage retrieval model). In some implementations, the retrieval model 145 includes a question encoder 150. In some implementations, the fine-tuned machine learning model 137 is associated with a vocabulary 155. The vocabulary 155 may include a plurality of tokens that each represent a term. The fine-tuned machine learning model 137, the one or more tools 138, the large language model 140, the retrieval model 145, the question encoder 150, and the vocabulary 155 are described below in further detail. In some implementations, the large language model 140 is a generator model.

As mentioned above, the input/output interface 135 of the electronic computing device 105 may include a transceiver. The transceiver is configured to transfer and receive information with the one or more communication networks 120. The transceiver may also comprise one or more wired transceivers, such as an Ethernet transceiver, a USB (Universal Serial Bus) transceiver, or similar transceiver configurable to communicate via a twisted pair wire, a coaxial cable, a fiber-optic link, or a similar physical connection to a wired network. In some implementations, the input/output interface 135 includes separate transmitting and receiving components, for example, a transmitter and a receiver, instead of a combined transceiver.

The electronic processor 125, the memory 130, and the input/output interface 135 may include various digital and analog components, which for brevity are not described herein and which may be implemented in hardware, software, or a combination of both.

In some implementations, the user device 110 is a personal computing device such as a desktop computer, a laptop computer, a tablet, a smartphone, or the like. In some implementations, the user device 110 includes an output device (for example, a speaker, a screen, a combination of the foregoing, and the like) and an input device (for example, a mouse, a keyboard, a touchscreen, a microphone, a combination of the foregoing, or the like). In some implementations, the user device 110 is configured to send signals and information to and receive signals and information from the electronic computing device 105, the file repository 115, or both.

In some implementations, the file repository 115 may be a database or other data storage system. The file repository 115 may include many different types of files. For example, the file repository 115 may include text files (for example, e-mail files, document files, and the like) and non-text files (for example, audio files, video files, and the like). In some implementations, the file repository 115 is configured to send signals and information to and receive signals and information from the electronic computing device 105, the user device 110, or both.

FIG. 2 provides a flowchart of an example method 200 for generating a fine-tuned machine learning model (e.g., the fine-tuned machine learning model 137) to provide a domain-focused answer (optionally, a natural language answer) to a natural language question. The method 200 is described as being performed via the electronic computing device 105 (e.g., via the electronic processor 125 processing instructions and data, such as the models, data, and associated instructions stored in the memory 130). However, it should be understood that the method 200 may be performed via a collection of devices in various configurations.

As illustrated in FIG. 2, the method 200 includes, at block 205, the electronic processor 125 creating, from a plurality of files (e.g., as stored in the file repository 115), a plurality of fine-tuning data examples. In some implementations, each respective fine-tuning data example of the plurality of fine-tuning data examples includes a question, an answer, and a supporting citation (also referred to herein as a citation).

Figure 3:
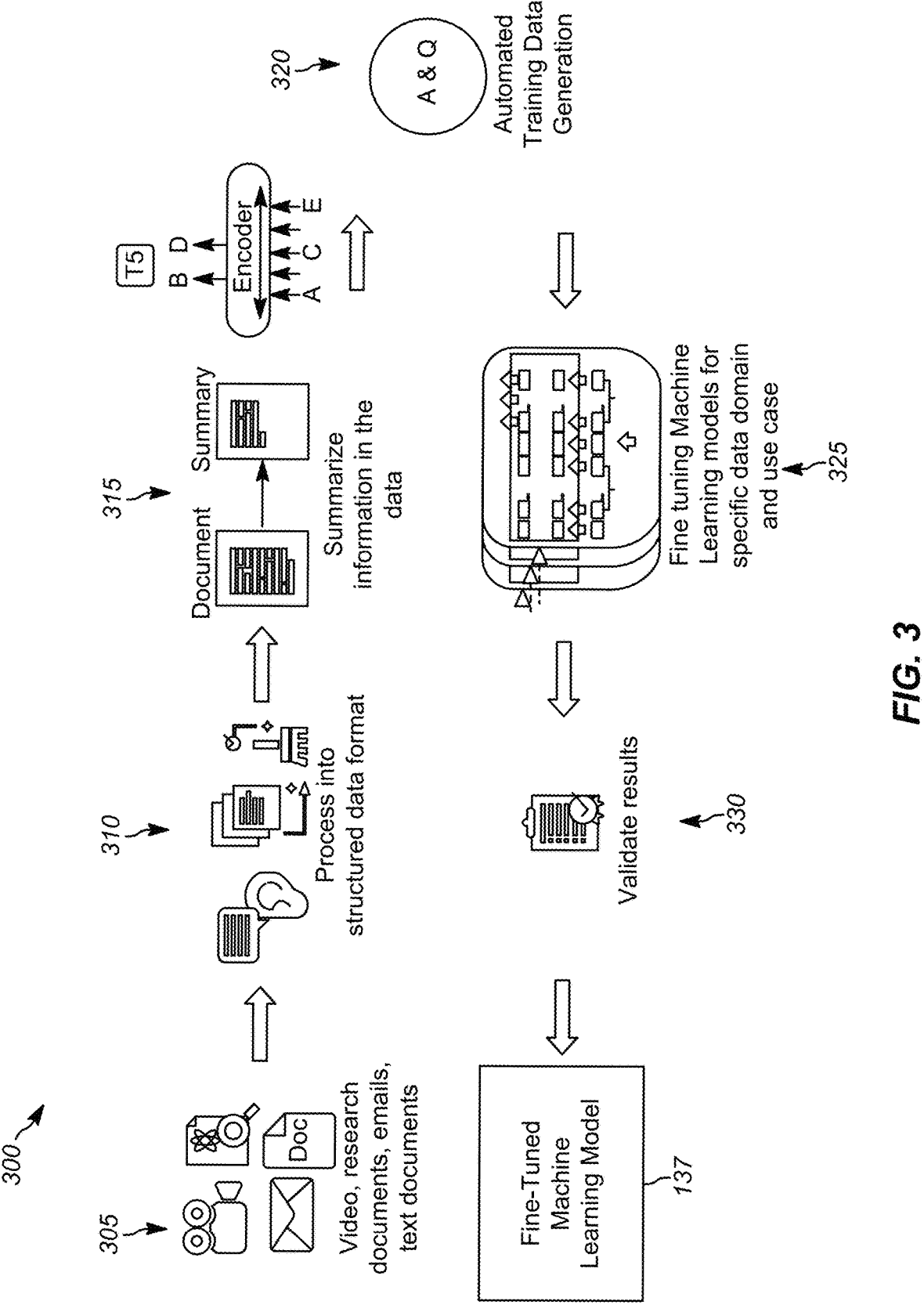
FIG. 3 is a pictorial representation of a method for generating fine-tuning data examples for the system of FIG. 1 as part of the method of FIG. 2 according to some implementations.

FIG. 3 provides a pictorial representation of an example method 300 for generating the plurality of fine-tuning data examples. For example, the electronic processor 125 may receive from the file repository 115 a plurality of files of one or more file types. In some implementations, the file repository 115 sends the plurality of files to the electronic processor 125 in response to receiving a request for the plurality of files from the electronic processor 125. For example, the electronic processor 125 sends, to the file repository 115, a request for a plurality of files associated with a domain (e.g., periodically, on user-demand, in response to a detected triggering event, or a combination thereof), and, in response, the file repository 115 sends to the electronic processor 125 the plurality of files associated with the domain. However, in other implementations, updated and/or newly-created files may be pushed to the electronic processor 125 or the electronic processor 125 may be otherwise alerted to the presence of such data. In some examples, as illustrated in block 305 of FIG. 3, the plurality of files includes a plurality of file types. In the example illustrated in FIG. 3, the plurality of file types includes video files, email files, research documents, text documents, or a combination thereof. However, the plurality of file types may include more file types than those illustrated in FIG. 3 and various combinations of the listed types. It should be understood that the files or folders used from the file repository 115 may include all available files or folders some filtered set of what is available, wherein the filtering may be performed as one or more pre-processing step configured for the applicable application (e.g., on a case-by-case basis).

In some implementations, at block 310, the electronic processor 125 converts information included in the plurality of files into a particular data format. For example, the electronic processor 125 may convert the non-text files included in the plurality of files to text files, such as, for example, by using one or more transcription tools, image processing tools, or the like.

Converting the information may also include dividing files into a plurality of sections. One or more text segmentation or chunking tools (e.g., included in the tools 138) may be used to create the sections in a file. As one non-limiting example, the electronic processor 125 may use ruptures to perform file chunking. Ruptres is a Python library that, when called by the electronic processor 125, performs semantic segmentation using level-shift detection processes for sequenced data, which identifies semantic structures in data (e.g., structured or unstructured data). Such segmentation may be performed as intent segmentation, topic segmentation, sentence segmentation, or the like, such as, for example, identifying contextually similar text. Each section of text may be associated with the file that the section of text is extracted from and a citation to the portion of the file that the text is extracted from. For example, a section of text that is extracted from a video file may be associated with timestamps (for example, a start time and an end time) indicating the section of the video that the section of text was extracted from as well as the file name of the video file that the text was extracted from.

In some implementations, at block 315, the electronic processor 125 generates, for each section of the plurality of sections generated at block 310 from the plurality of files, an answer based on the section. In some examples, the answer summarizes the section. In some implementations, the electronic processor 125 executes an answer generation machine learning model (for example, a large language model such as an encoder-decoder transformer (for example, a T5 transformer), which may be one of the tools 138 included in the memory 130) to generate an answer based on a section.

In some implementations, at block 320, the electronic processor 125, using a question generation machine learning model (for example, a large language model, which may be one of the tools 138 included in the memory 130), generates a question based on the answer generated for each section. In some implementations, the question generation machine learning model may be a summarization transformer, such as, for example, a T5 transformer.

In some implementations, the electronic processor 125 determines a subsection of the section supporting the generated answer. In some implementations, the electronic processor 125 determines an answer index of a subsection of the section supporting the answer by determining, for each subsection of a plurality of subsections included in the section, a distance between the subsection and the answer using string comparison. The electronic processor 125 may determine the subsection with a smallest Levenshtein distance between itself and the answer to be the subsection of the section supporting the answer. In some implementations, the electronic processor 125 utilizes Levenshtein distance algorithm, a Jaro-Winkler distance algorithm, the Jaccard index algorithm, or the like to determine an answer index of a subsection of the section supporting the answer. In some implementations, the answer index may define a subset of words in the list of words that make up a section as the subsection supporting the answer. For example, the answer index may be 0:125. In this example, the answer index defines the subsection supporting the answer as the $0^{th}$ word to the $124^{th}$ word of the list of words that make up the section.

Returning to FIG. 2, at block 210, the electronic processor 125 fine-tunes a pre-trained foundational machine learning model to generate a fine-tuned machine learning model (the fine-tuned machine learning model 137 including the retrieval model 145 and the large language model 140) using the plurality of fine-tuning data examples, which may include a triplet including the question, the answer, and the corresponding citations or supporting subsection(s). As illustrated in FIG. 3, the plurality of fine-tuning data examples may be used to fine-tune the pre-trained foundational machine learning model (block 325) and also validates the results of fine-tuning the pre-trained foundational machine learning model (block 330).

FIG. 4 provides an example table 400 of fine-tuning data examples. Each row of the table 400 includes a fine-tuning data example. Columns 405, 410, 415, and 420 provide a citation included in the fine-tuning data example, column 425 provides an answer included in a fine-tuning data example, and column 430 provides a question included in the fine-tuning data example. Each citation includes a reference to a subsection (column 415), a section (column 410), and a file (column 405) supporting the answer. In some implementations, citations included in fine-tuning data examples also include a sentence (column 420) supporting the answer. Including the a sentence in the citation may help a fine-tuned model (for example, the fine-tuned machine learning model 137) learn what the salient content is from within a full passage or section. In other words, including a sentence in the citation helps concentrate the answer generated by the fine-tuned machine learning model 137.

It should be understood that other ways of identifying supporting material for a question-and-answer pair may be used as part of the fine-tuning data examples. For example, an answer index may identify the subsection of a subsection supporting the answer.

The pre-trained foundational machine learning model includes a large language model that is pre-trained using a plurality of general language files. In some implementations, the pre-trained foundational machine learning model also includes a retrieval model that is similarly pre-trained using a plurality of general language files. In such implementations, the electronic processor 125 may be configured to fine-tune one or more transformers included in the foundational machine learning model (for example the large language module, the retrieval model, or both) using the generated fine-tuning data examples. In some implementations, the electronic processor 125 may fine-tune the retrieval model with an augmented version of the fine-tuning data examples (i.e., a plurality of augmented fine-tuning data examples). Similar to each fine-tuning data example of the plurality of fine-tuning data examples, each fine-tuning data example of the plurality of augmented fine-tuning data examples, includes a question, an answer, and a citation to a subsection, a section, and a file supporting the answer. Unlike the fine-tuning data examples of the plurality of fine-tuning data examples, each of the augmented fine-tuning data examples include a hard negative citation to a file that is irrelevant to the answer. A hard negative citation is a citation to a file that the retrieval model should not retrieve in response to the question being input to the retrieval model. In some implementations, hard negative citations are retriever based hard negatives citations that are gleaned from the pre-trained foundational machine learning model prior to fine-tuning.

In some implementations, the electronic processor 125 periodically performs additional fine-tuning of the fine-tuned machine learning model 137 by repeating blocks 205 and 210 of the method 200. In some implementations, electronic processor 125 repeats blocks 205 and 210 when a file repository 115 is updated (for example, when one or more files associated with the domain are added to the file repository 115). In some implementations, electronic processor 125 repeats blocks 205 and 210 when a file repository 115 is updated and a predetermined amount of time has passed since the most previous execution of blocks 205 and 210. In some implementations, when block 205 is re-performed by the electronic processor 125, the plurality of files used to generate the fine-tuning data examples includes only those files added to the file repository 115 after the most previous execution of block 205.

Figure 5:
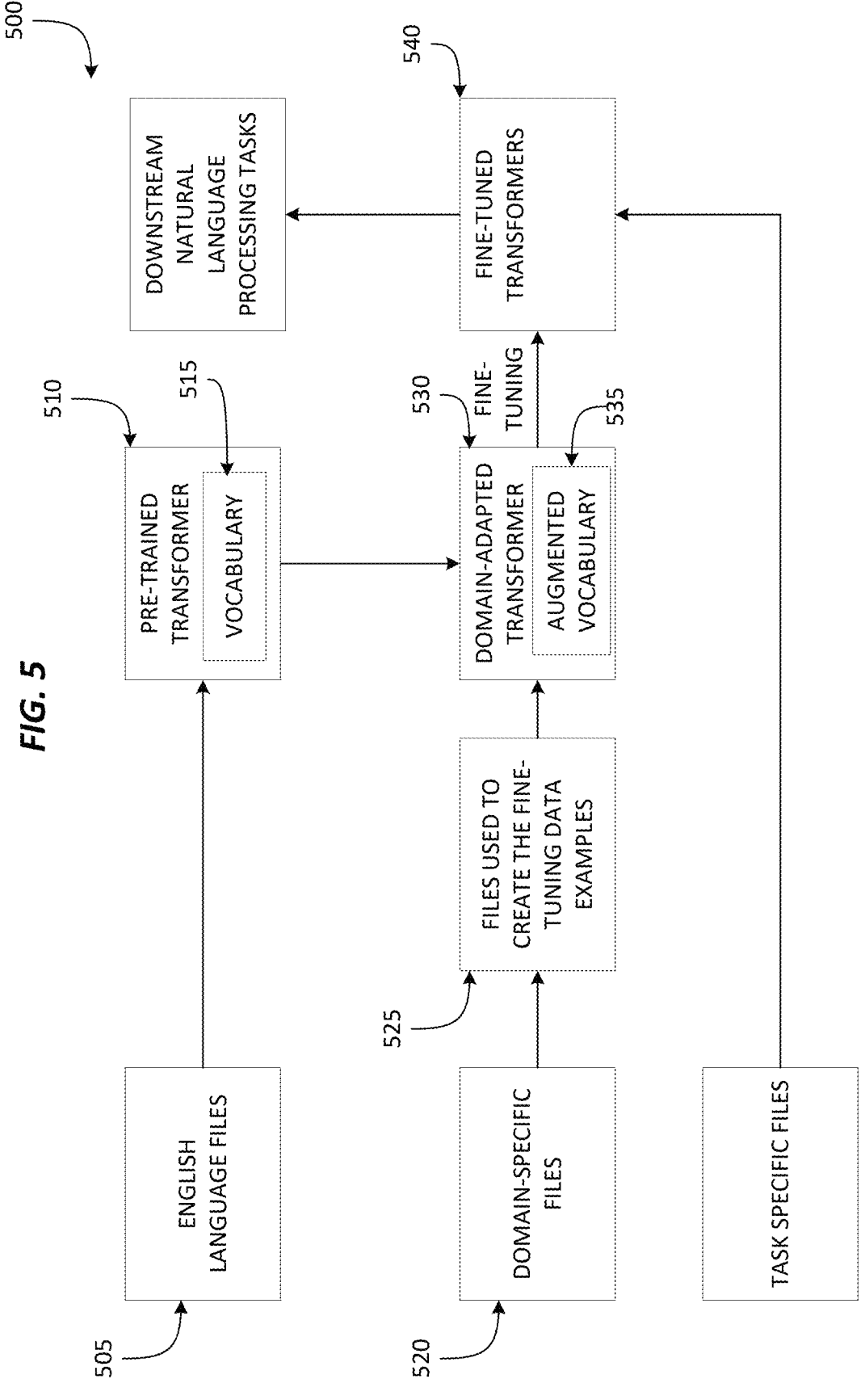
FIG. 5 is a pictorial representation of a method for fine-tuning the system of FIG. 1 as part of the method of FIG. 2 according to some implementations.

FIG. 5 provides a pictorial representation of an example method 500 for generating the fine-tuned machine learning model 137. As illustrated in FIG. 5, the foundational machine learning model is pre-trained using a corpus of files, such as a plurality of general language files (in the example illustrated in FIG. 5, English language files) to establish a pre-trained transformer 510 (the pre-trained foundational model). The pre-trained foundational machine learning model is associated with a vocabulary 515 and may include a retrieval model (including a question encoder) and a large language model. In some implementations, the pre-trained foundational machine learning model includes one or more transformer-based models. For example, the question encoder and the large language model may be transformer-based models. The vocabulary 515 associated with the pre-trained foundational machine learning model (the pre-trained transformer 510) may include general (e.g., English) language terms.

As illustrated in FIG. 5, the plurality of files 525 used to create the fine-tuning data examples are retrieved from plurality of domain-specific files 520 (e.g., as stored in the file repository 115) used to generate the fine-tuning data examples as described above. As part of active learning, the files used to create the fine-tuning data examples 525 are used to perform domain adaptation/continued pre-training and vocabulary augmentation to transform the pre-trained transformer 510 into a domain-adapted transformer 530.

In some implementations, in addition to utilizing the plurality of files 525 to create the plurality of fine-tuning data examples, the electronic processor 125 also utilizes the plurality of files 525 to augment the vocabulary 515 of the pre-trained transformer 510 and establish an augmented vocabulary 535 of the domain-adapted transformer 530 (i.e., create the vocabulary 155 of the fine-tuned machine learning model 137). To augment the vocabulary 515, the electronic processor 125 generates, from the plurality of files 525, a plurality of tokens associated with a minimal likelihood of creating noise. Each of the plurality of tokens may represent a term. In some implementations, the plurality of tokens are determined by the electronic processor 125 using active learning algorithms that apply a combination of diversity and uncertainty sampling. The electronic processor 125 may add the plurality of tokens to the vocabulary 515 to augment the vocabulary 515 and create an augmented vocabulary 535 (i.e., the vocabulary 155 as described above). Returning to FIG. 4, column 435 provides example terms that may be represented by tokens added to the vocabulary from the file "file 123." As illustrated in FIG. 4, the added terms may be domain specific rather than general English language terms. For example, the domain specific terms may be company or organization names (for example, "Company X" in FIG. 4), product names (for example, "Widget Y" in FIG. 4), acronyms or abbreviations (for example, "$5^{th}$ gen" in FIG. 4), a combination of the foregoing, or the like.

Figure 6A:
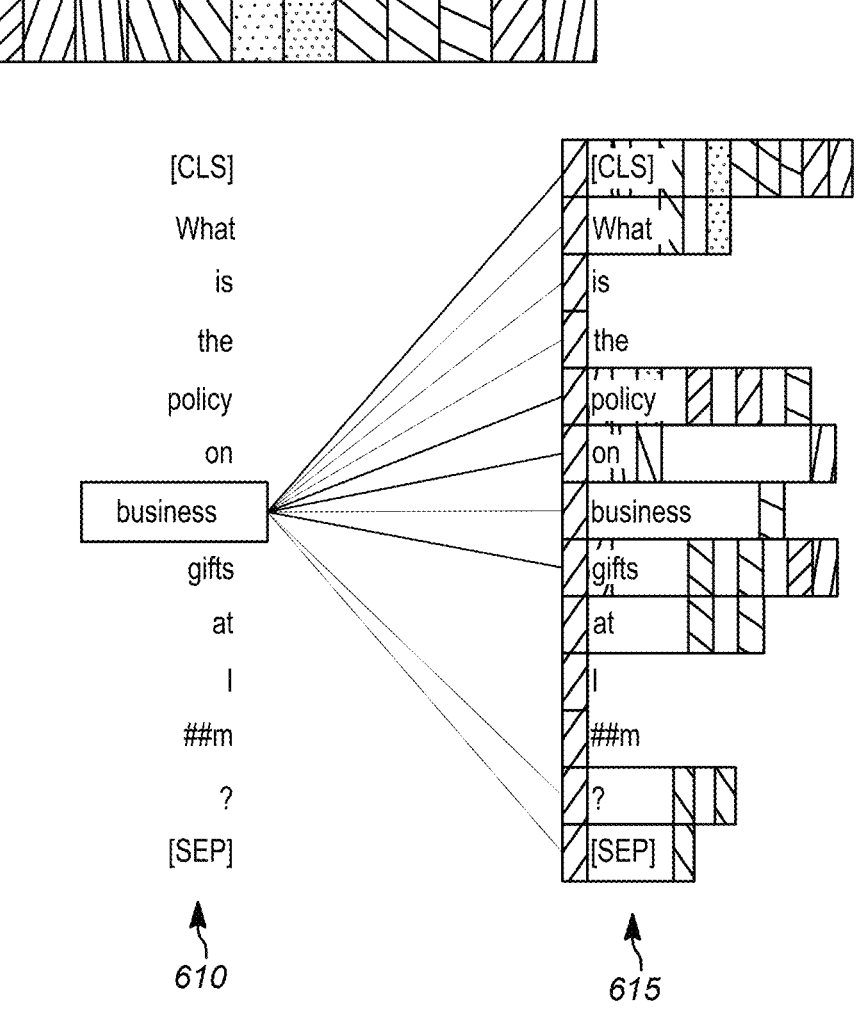
FIGS. 6A and 6B illustrate effects of augmenting a vocabulary of the system of FIG. 1 according to some implementations.
Figure 6B:
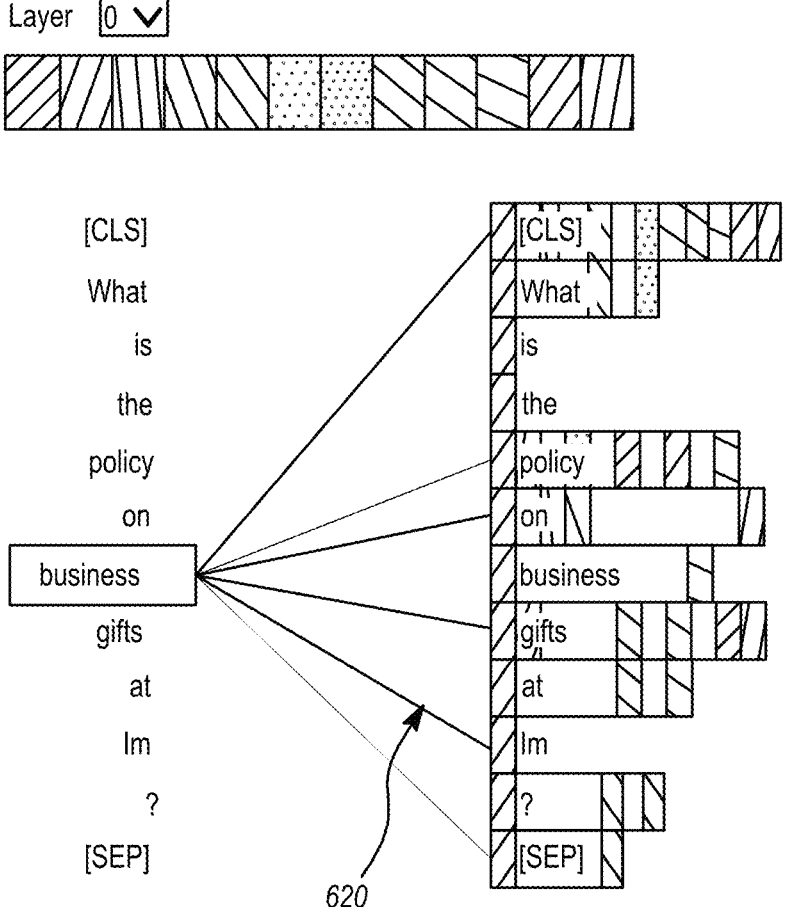

In some implementations, the electronic processor 125, as part of augmenting the vocabulary, initializes (with a random number), a vector for each of the plurality of tokens added to the vocabulary 515 and, thus, initializes a number of vectors equal to the number of tokens. In some implementations, the electronic processor 125 initializes the vectors in embedding layers corresponding to tokenization and vocabulary in the retrieval model (including, for example, the question encoder and a passage encoder) and the large language model of the pre-trained foundational model. In some implementations, the electronic processor 125 augments the vocabulary 155 prior to fine-tuning the pre-trained foundational machine learning model at block 210 with the plurality of fine-tuning data examples. In some implementations, augmenting the vocabulary 515 with domain specific terms avoids domain specific terms being divided into sub-tokens, allows the fine-tuned machine learning model 137 to more accurately learn the relationship between domain specific tokens (for example, domain specific terms) and non-domain specific tokens (for example, general English language terms), and focuses the fine-tuned machine learning model 137 on domain-specific content during fine-tuning. For example, FIGS. 6A and 6B provide a pictorial illustration of the effects of augmenting the vocabulary 155. In the example illustrated in FIGS. 6A and 6B, the token "lm" is a domain specific term. FIG. 6A provides an example of tokens that the question encoder 150 determines are included in the natural language question "what is the policy on business gifts at lm?" and the relationships between the tokens that are determined by the question encoder 150 when the vocabulary 155 is not augmented. FIG. 6B provides an example of tokens that the question encoder 150 determines are included in the natural language question "what is the policy on business gifts at lm?" and the relationships between the tokens that are determined by the question encoder 150 when the vocabulary 155 is augmented. In some implementations, the relationships between the tokens are determined by the question encoder 150 using an attention head interpretability method. As shown in FIG. 6A, when the vocabulary 155 is not augmented, the question encoder 150 breaks the domain specific term "lm" into the sub-tokens 'l' and 'm' and, as shown by the fact that there is no line connecting general English language term "business" in the left hand column 610 to 'l' or 'm' included in the righthand column 615, the question encoder 150 does not determine there is a relationship between the general English language term "business" and the domain specific term "lm." However, as shown in FIG. 6B, when the vocabulary 155 is augmented, the question encoder 150 creates a token associated with the domain specific term "lm" and, as shown by the line 620, correctly determines there is a relationship between the general English language term "business" and the domain specific term "lm." As illustrated, augmenting the vocabulary 155 allows the domain-specific system to better understand and respond to questions including domain-specific terms, such as, for example, abbreviations, acronyms, and other terms that may have particular meaning within the domain (e.g., different than any meanings in general language).

After performing domain adaptation/continued pre-training and vocabulary augmentation, the domain-adapted system (e.g., the fine-tuned machine learning model 137) can be used to receive a natural language question and output a natural language response. It should be understood that further fine-tuning may be performed to create a set of fine-tuned models (transformers) 540 that may each be tuned for a particular task (e.g., a particular downstream natural language processing task). This fine-tuning may be performed using a subset of the domain-specific files 520 that may be, for example, task specific. In some implementations, the electronic processor 125 may perform hyperparameter optimization using a hyperparameter optimization software framework, such as, for example, Ray-Tune, Optuna, Hyperopt, mlmachine, Polyaxon, or the like, to generate the fine-tuned transformers 540. In some implementations, the electronic processor 125 may perturb or add noise to the questions included in fine-tuning data examples to ensure the fine-tuned transformers 540 have layers that promote adversarial robustness.

For example, returning to FIG. 2, at block 215, the electronic processor 125 may input a natural language question to the fine-tuned machine learning model 137. In some implementations, the electronic processor 125 may receive the natural language question from the user device 110. The output from the model 137 includes a natural language answer and supporting citations. For example, the natural language question may be input to the retrieval model 145, which outputs a set of relevant sections and subsections of files. In other words, the retrieval model 145, as fine-tuned and executed by the electronic processor 125, retrieves (at block 220) one or more files including one or more sections relevant to the natural language question (e.g., from the file repository 115) and identifies the one or more sections and subsections of the one or more sections that are relevant to answering the natural language question. Based on the one or more relevant sections of the one or more retrieved files and the original question, the large language model 140 (at block 225) constructs a natural language answer to the natural language question.

Figure 7:
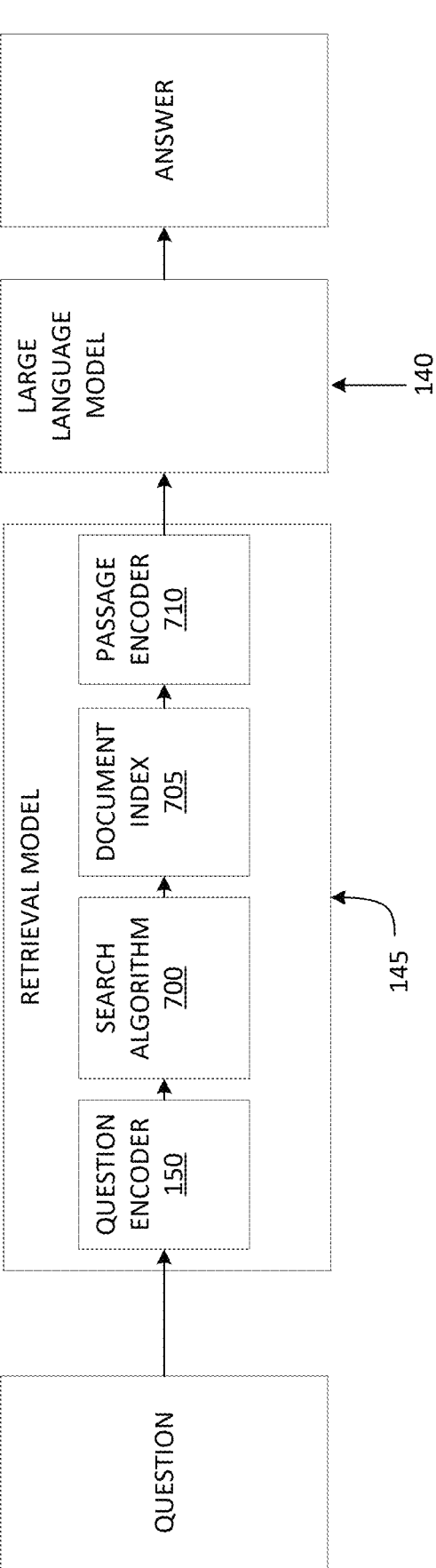
FIG. 7 is a pictorial representation of a method for generating a natural language answer to a natural language question as part of the method of FIG. 2 according to some implementations.

FIG. 7 provides an example pictorial representation of the functionality described above in relation to blocks 220 and 225. In some implementations, the retrieval model 145 includes the question encoder 150 (for example, a large language model such as bidirectional encoder representations from transformers (BERT)) a search algorithm 700 (for example, maximum inner product search (MIPS)), a document index 705, and a passage encoder 710. In some implementations, the natural language question is initially input into the question encoder 150, which uses the vocabulary 155 to tokenize the question. The resulting tokens are then input into to the search algorithm 700, which retrieves the top K files that are most relevant to the question, where K is a predetermined number (e.g., 5). In some implementations, the files retrieved by the search algorithm 700 are then indexed by the document index 705 to determine the one or more sections and subsections of the retrieved files that are relevant to answering the natural language question. In some implementations, the passage encoder 710 tokenizes the one or more sections and subsections determined by the document index 705. In some implementations, the one or more tokenized sections and subsections determined by the retrieval model 145 are input into the large language model 140 and the large language model 140 generates a natural language answer to the natural language question based on the one or more sections and subsections determined by the retrieval model 145. In some implementations, large language model 140 generates a set of possible natural language answers to the natural language question. In some implementations, a perturbation process may be applied to the set of natural language answers to expand the set of possible natural language answers and rank each possible answer included in the set based on a retriever score associated with the possible answer. In some implementations, the electronic processor 125 determines the answer associated with the highest retriever score to be the natural language answer to the natural language question.

In some implementations, the natural language question input to the fine-tuned machine learning model 137 does not need to be formatted as a question for the fine-tuned machine learning model 137 to provide an answer. For example, in response to receiving a factual statement as input, the fine-tuned machine learning model 137 may generate an answer that provides support for the factual statement. In another example, in response to receiving a term as input, the fine-tuned machine learning model 137 may provide an answer that includes a definition of the term.

In some implementations, the fine-tuned machine learning model 137 outputs the natural language answer to the natural language question and an indication of the one or more files, the one or more relevant sections, or both that the natural language answer is based on. In some implementations, the fine-tuned machine learning model 137 may also output an indication of one or more relevant subsections of the one or more relevant sections that the natural language answer is based on. In some implementations, at block 230, the electronic processor 125 retrieves, from the fine-tuned machine learning model 137, the natural language answer to the natural language question and an indication of the one or more files, the one or more relevant sections, or both that the natural language answer is based on. In some implementations, the electronic processor 125 also retrieves an indication of one or more relevant subsections of the one or more relevant sections that the natural language answer is based on. In some implementations, the electronic processor 125 generates for display, via a user interface (for example, a user interface that may be displayed via an output device of the user device 110), the natural language answer, the one or more relevant sections that the natural language answer is based on, and, optionally, one or more indications of or links to the one or more files the natural language answer is based on. In some examples, in each of the one or more relevant sections displayed via the user interface, a subsection of the relevant section supporting the answer is highlighted. In some implementations, in addition to or instead of generating for display one or more relevant sections of text that the natural language answer is based on, the electronic processor 125 generates for display or output an audio or video clip that the natural language answer is based on. In some implementations, an audio or video clip that the natural language answer is based on is retrieved by the electronic processor 125 from, for example, the file repository 115 using the one or more relevant sections and timestamps associated with the one or more relevant sections.

In some implementations, when a link is selected, the user device 110 may request, from the file repository 115 or elsewhere, a file associated with the selected link and, in response, receive the file from the file repository 115. The file associated with the selected link may be displayed via the user interface. In some implementations, the relevant section of the file is displayed via the user interface within the context of the entire file. For example, when a link to a video file is selected, a section of the video that is relevant to the natural language answer is displayed. However, a user may also be able to navigate to other sections of the video via the user interface.

Figure 8:
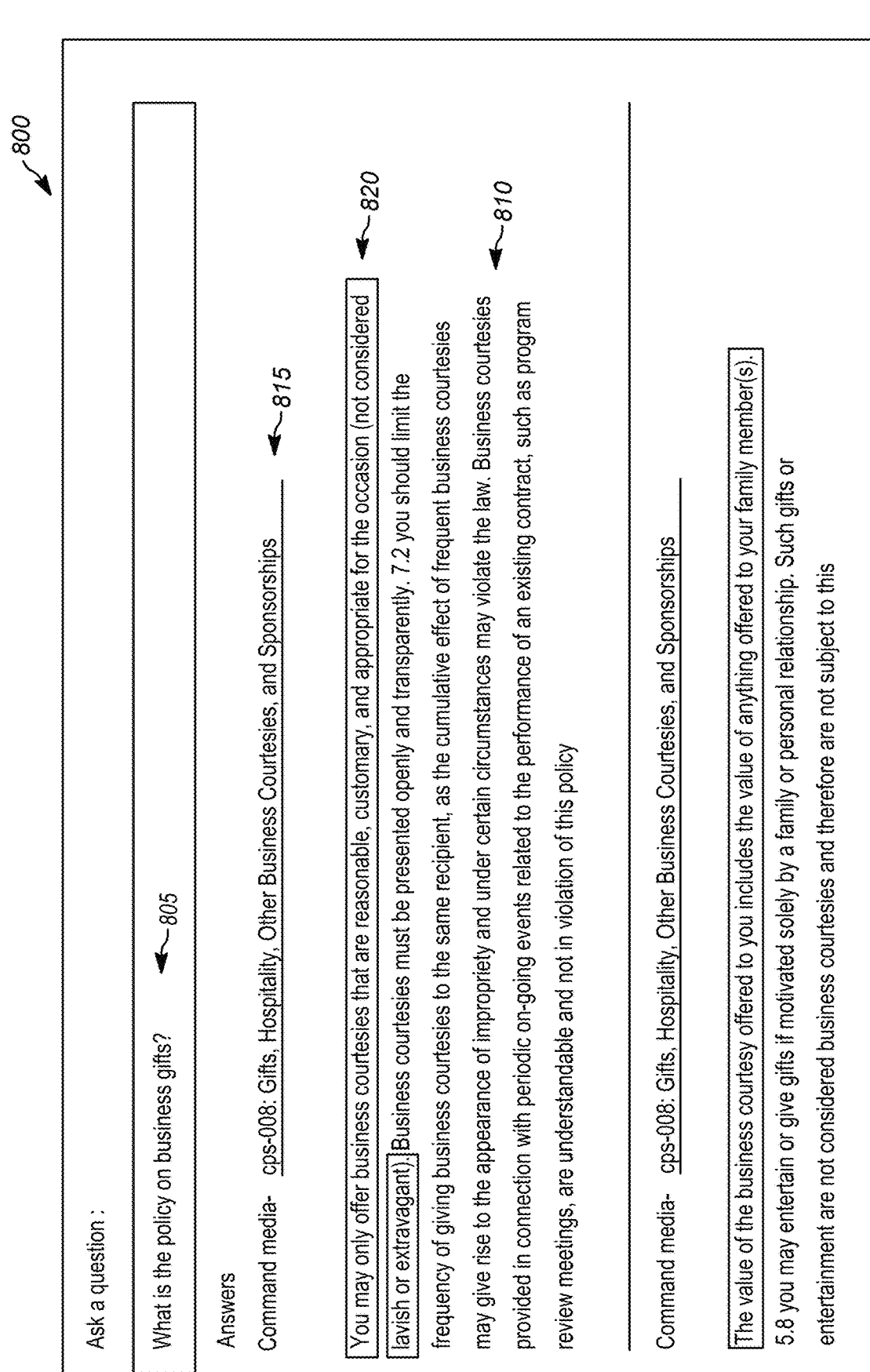
FIG. 8 illustrates an example user interface provided via the system of FIG. 1 including content generated based on a natural language question according to some implementations.

In some implementations, the electronic processor 125 may retrieve from, the fine-tuned machine learning model 137, the relevant files, sections, and subsections determined by the retrieval model 145 without retrieving a natural language answer. In other words, in some implementations, the fine-tuned machine learning model 137 does not include the large language model 140 and the relevant sections and subsections determined by the retrieval model 145 are not input to the large language model 140 to generate a natural language answer. In such implementations, the electronic processor 125 generates for display, via a user interface (for example, a user interface that may be displayed via an output device of the user device 110), the one or more sections, and, optionally, one or more links to the one or more files relevant to the natural language question. FIG. 8 illustrates a user interface 800 including a natural language question 805 and one or more sections relevant to the natural language question 805. For example, FIG. 8 includes a first relevant section 810 to the natural language question 805 and a link 815 to a file that includes the first relevant section 810. In the first relevant section 810, a subsection 820 that is relevant to the natural language question 805 is highlighted.

In the foregoing specification, specific implementations have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an implementation can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

Various features and advantages of the implementations described herein are set forth in the following claims.

What is claimed is:

1. A domain-focused natural language question and answer system, the system comprising:
  one or more electronic processors, the one or more electronic processors configured to:
    create, from a plurality of files, a plurality of fine-tuning data examples, each respective fine-tuning data example of the plurality of fine-tuning data examples including a question, an answer, and a supporting citation;
    fine-tune a pre-trained foundational machine learning model using the plurality of fine-tuning data examples to generate a fine-tuned machine learning model;
    input a natural language question to the fine-tuned machine learning model; and
    retrieve, from the fine-tuned machine learning model, a natural language answer to the natural language question and an indication of one or more files, one or more relevant sections, or both that the natural language answer is based on, wherein the fine-tuned machine learning model is configured to generate the natural language answer and the indication of the one or more files, the one or more relevant sections, or both that the answer is based on by:
      retrieving, using a retrieval model, the one or more files including the one or more sections relevant to the natural language question; and
      constructing, using a large language model, the natural language answer to the natural language question based on the one or more relevant sections of the one or more retrieved files,
    wherein the one or more electronic processors are further configured to augment a vocabulary of the pre-trained foundational machine learning model using the plurality of files by:
      generating, from the plurality of files, a plurality of tokens associated with a minimal likelihood of creating noise in the pre-trained foundational machine learning model, wherein each token represents a domain-specific term included in the plurality of files;

adding the plurality of tokens to the vocabulary; and
      initializing, in the pre-trained foundational machine learning model, a number of vectors equal to the plurality of tokens.

2. The system according to claim 1, wherein the one or more electronic processors are configured to create, from the plurality of files, the plurality of fine-tuning data examples by:
  dividing each file of the plurality of files into a plurality of sections; and
  for each section of the plurality of sections, creating one or more fine-tuning data examples by:
    generating, using an answer generation machine learning model, an answer based on the section, wherein the answer summarizes the section;
    generating, using a question generation machine learning model, a question based on the answer; and
    determining a subsection of the section supporting the answer.

3. The system according to claim 2, wherein the one or more electronic processors are configured to determine the subsection of the section supporting the answer by:
  for each subsection of a plurality of subsections included in the section, determining, using string comparison, a distance between the subsection and the answer; and
  determining the subsection with a smallest distance between itself and the answer is the subsection of the section supporting the answer.

4. The system according to claim 1, wherein each supporting citation includes a reference to a subsection, a section, and a file supporting the answer.

5. The system according to claim 1, wherein the plurality of files are associated with a domain.

6. The system according to claim 1, wherein the one or more electronic processors are configured to:
  generate for display, via a user interface, the natural language answer, the one or more relevant sections that the natural language answer is based on, and one or more links to the one or more files the natural language answer is based on, wherein, for each of the one or more relevant sections, a subsection of the relevant section supporting the answer is highlighted in the relevant section.

7. The system according to claim 1, wherein the plurality of files include text files and non-text files and the one or more electronic processors are further configured to:
  convert the non-text files to text files.

8. The system according to claim 1, wherein the one or more electronic processors are configured to:
  fine-tune the retrieval model using a plurality of augmented fine-tuning data examples including a question, an answer, a supporting citation to subsection, a section, and a file supporting the answer, and a hard negative citation to a file that is irrelevant to the answer.

9. The system according to claim 1, wherein the one or more electronic processors are configured to:
  perform hyperparameter optimization using a hyperparameter optimization software framework to generate a set of fine-tuned transformers, wherein each transformer is fine-tuned to perform a particular downstream natural language processing task.

10. A method for generating a fine-tuned machine learning model to provide a domain-focused natural language answer to a natural language question, the method comprising:
  creating, from a plurality of files, a plurality of fine-tuning data examples, each respective fine-tuning data example of the plurality of fine-tuning data examples including a question, an answer, and a supporting citation;

fine-tuning a pre-trained foundational machine learning model using the plurality of fine-tuning data examples to generate a fine-tuned machine learning model;

inputting a natural language question to the fine-tuned machine learning model; and retrieving, from the fine-tuned machine learning model, a natural language answer to the natural language question and an indication of one or more files, one or more relevant sections, or both that the natural language answer is based on, wherein the fine-tuned machine learning model is configured to generate the natural language answer and the indication of the one or more files, the one or more relevant sections, or both that the answer is based on by:

retrieving, using a retrieval model, the one or more files including the one or more sections relevant to the natural language question; and constructing, using a large language model, the natural language answer to the natural language question based on the one or more relevant sections of the one or more retrieved files, the method further comprising augmenting a vocabulary of the pre-trained foundational machine learning model using the plurality of files, wherein augmenting a vocabulary of the pre-trained foundational machine learning model using the plurality of files includes:

generating, from the plurality of files, a plurality of tokens associated with a minimal likelihood of creating noise in the pre-trained foundational machine learning model, wherein each token represents a domain-specific term included in the plurality of files, adding the plurality of tokens to the vocabulary; and initializing, in the pre-trained foundational machine learning model, a number of vectors equal to the plurality of tokens.

11. The method according to claim 10, the method further comprising retrieving an indication of one or more relevant subsections of the one or more relevant sections that the natural language answer is based on.

12. The method according to claim 10, wherein creating, from the plurality of files, the plurality of fine-tuning data examples includes:

dividing each file of the plurality of files into a plurality of sections; and for each section of the plurality of sections, creating one or more fine-tuning data examples by:

generating, using an answer generation machine learning model, an answer based on the section, wherein the answer summarizes the section;

generating, using a question generation machine learning model, a question based on the answer; and determining a subsection of the section supporting the answer.

13. The method according to claim 12, wherein determining the subsection of the section supporting the answer includes:

for each subsection of a plurality of subsections included in the section, determining, using string comparison, a distance between the subsection and the answer; and determining the subsection with a smallest distance between itself and the answer is the subsection of the section supporting the answer.

14. The method according to claim 10, wherein each supporting citation includes a reference to a subsection, a section, and a file supporting the answer.

15. The method according to claim 10, wherein the plurality of files are associated with a domain.

16. The method according to claim 10, the method further comprising:

generating for display, via a user interface, the natural language answer, the one or more relevant sections that the natural language answer is based on, and one or more links to the one or more files the natural language answer is based on, wherein, for each of the one or more relevant sections, a subsection of the relevant section supporting the answer is highlighted in the relevant section.

17. The method according to claim 10, the method further comprising:

fine-tuning the retrieval model using a plurality of augmented fine-tuning data examples including a question, an answer, a supporting citation to subsection, a section, and a file supporting the answer, and a hard negative citation to a file that is irrelevant to the answer.

18. A domain-focused natural language question and answer system, the system comprising:

one or more electronic processors, the one or more electronic processors configured to:

create, from a plurality of files, a plurality of fine-tuning data examples, each respective fine-tuning data example of the plurality of fine-tuning data examples including a question, an answer, and a supporting citation;

fine-tune a pre-trained foundational machine learning model using the plurality of fine-tuning data examples to generate a fine-tuned machine learning model;

input a natural language question to the fine-tuned machine learning model; and retrieve, from the fine-tuned machine learning model, an indication of one or more files, one or more sections, or both that are relevant to the natural language question, wherein the fine-tuned machine learning model is configured to generate the indication of the one or more files, the one or more sections, or both that are relevant to the natural language question by:

retrieving, using a retrieval model, the one or more files including the one or more sections relevant to the natural language question, wherein the one or more electronic processors are further configured to augment a vocabulary of the pre-trained foundational machine learning model using the plurality of files by:

generating, from the plurality of files, a plurality of tokens associated with a minimal likelihood of creating noise in the pre-trained foundational machine learning model, wherein each token represents a domain-specific term included in the plurality of files;

adding the plurality of tokens to the vocabulary; and initializing, in the pre-trained foundational machine learning model, a number of vectors equal to the plurality of tokens.

* * * * *